(12) United States Patent
Kossak

(10) Patent No.: US 11,713,835 B2
(45) Date of Patent: Aug. 1, 2023

(54) CABLE BRACKET ASSEMBLY

(71) Applicant: Panduit Corp., Tinley Park, IL (US)

(72) Inventor: Robert W. Kossak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/342,043

(22) Filed: Jun. 8, 2021

(65) Prior Publication Data

US 2021/0396333 A1 Dec. 23, 2021

Related U.S. Application Data

(60) Provisional application No. 63/040,572, filed on Jun. 18, 2020.

(51) Int. Cl.
  *F16L 3/24* (2006.01)
  *F16L 3/137* (2006.01)
  *F16B 5/12* (2006.01)
  *F16L 3/233* (2006.01)

(52) U.S. Cl.
  CPC .............. *F16L 3/245* (2019.08); *F16B 5/126* (2013.01); *F16L 3/137* (2013.01); *F16L 3/233* (2013.01)

(58) Field of Classification Search
  CPC . F16L 3/245; F16L 3/137; F16L 3/233; F16B 5/126; F16B 7/0473; F16B 2/243; F16B 2/08
  See application file for complete search history.

(56) References Cited

U.S. PATENT DOCUMENTS

| | | |
|---|---|---|
| 656,274 A | 8/1900 | Streeter |
| 2,470,992 A | 5/1949 | Kindorf et al. |
| 2,712,917 A | 7/1955 | Flora et al. |
| 3,216,685 A | 11/1965 | Raymond |
| 3,667,711 A | 6/1972 | Kissel |
| 4,440,374 A | 4/1984 | Achille |
| 4,542,871 A * | 9/1985 | Fortsch ............. F16L 3/245 248/68.1 |
| 6,643,900 B2 | 11/2003 | Jährling |
| 8,931,747 B2 | 1/2015 | Davis |
| 9,309,719 B2 * | 4/2016 | Sylvester ............. H02G 3/30 |
| 9,548,598 B2 | 1/2017 | Tally et al. |
| 9,587,433 B2 | 3/2017 | Sylvester et al. |
| 9,882,365 B2 | 1/2018 | Sylvester et al. |
| 10,253,905 B2 | 4/2019 | Martin |
| 10,407,985 B2 | 9/2019 | Sylvester et al. |
| 2014/0239131 A1 * | 8/2014 | Sylvester ............. H02G 3/32 248/68.1 |
| 2015/0275578 A1 * | 10/2015 | Sylvester ............. E06C 7/14 248/68.1 |
| 2016/0025244 A1 * | 1/2016 | Tally ............. H02G 3/32 29/428 |
| 2017/0197554 A1 * | 7/2017 | Rouleau ............. B60R 9/0485 |

(Continued)

*Primary Examiner* — Terrell L McKinnon
*Assistant Examiner* — Ding Y Tan
(74) *Attorney, Agent, or Firm* — Christopher S. Clancy; James H. Williams; Aimee E. McVady

(57) ABSTRACT

A mounting bracket used to attach cables to a cable tray rung. The mounting bracket has a bracket main body and a bracket spring attachment. The bracket main body includes a base plate and a cable attachment member for supporting the cables. The bracket spring attachment slidingly engages the bracket main body to form the mounting bracket. The bracket spring attachment secures the assembled mounting bracket to the cable tray rung.

16 Claims, 20 Drawing Sheets

(56) References Cited

U.S. PATENT DOCUMENTS

2017/0317480 A1* 11/2017 Rouleau .................. H02G 3/32
2018/0163469 A1* 6/2018 Sylvester ................. E06C 7/14
2020/0059075 A1* 2/2020 Rouleau .............. H02G 3/0456
2020/0287365 A1* 9/2020 Rouleau ................ F16M 13/02

* cited by examiner

US 11,713,835 B2

CABLE BRACKET ASSEMBLY

CROSS REFERENCE TO RELATED APPLICATION(S)

This application claims benefit to U.S. Provisional Patent Application No. 63/040,572, filed on Jun. 18, 2020, the entirety of which is hereby incorporated by reference herein.

FIELD OF THE INVENTION

The present invention relates to a bracket for attaching cables to a cable tray, and more particularly to a two-piece quick attach bracket for attaching cables to a cable tray.

BACKGROUND OF THE INVENTION

There are a variety of mounting brackets designed to be attached to the rungs of cable trays, cable racks, or other similar structural members. The mounting brackets secure a single cable or cable bundles to the rungs by cable ties or straps. Most of the mounting brackets require hardware to attach the bracket to the rung. The hardware can be part of the bracket, such as the brackets disclosed in commonly owned U.S. Pat. Nos. 9,587,433 and 9,882,365, or the hardware may be separate fasteners.

Mounting brackets have also been designed to snap on to the rungs of cable trays, cable racks, or other similar structural members, such as the bracket disclosed in commonly owned U.S. Pat. No. 10,407,985. The snap on brackets may be difficult to install and once installed, they are not easy to reposition on the rung because removal or sliding along the rung may damage the rung.

Thus, it is desirable to provide a mounting bracket that is efficiently installed or removed thereby significantly reducing labor costs and increasing productivity.

SUMMARY OF THE INVENTION

A two-piece cable bracket used to secure a cable to a cable tray rung. The two-piece cable bracket has a main body and a bracket spring attachment member. The main body of the bracket has a base plate and a cable attachment member. The bracket spring attachment member slidingly engages the main body and secures the two-piece cable bracket to the cable tray rung. The cable is positioned on the cable tray rung. The cable attachment member supports the cable and a tie secures the cable to the cable attachment member.

DETAILED DESCRIPTION

Figure 1:
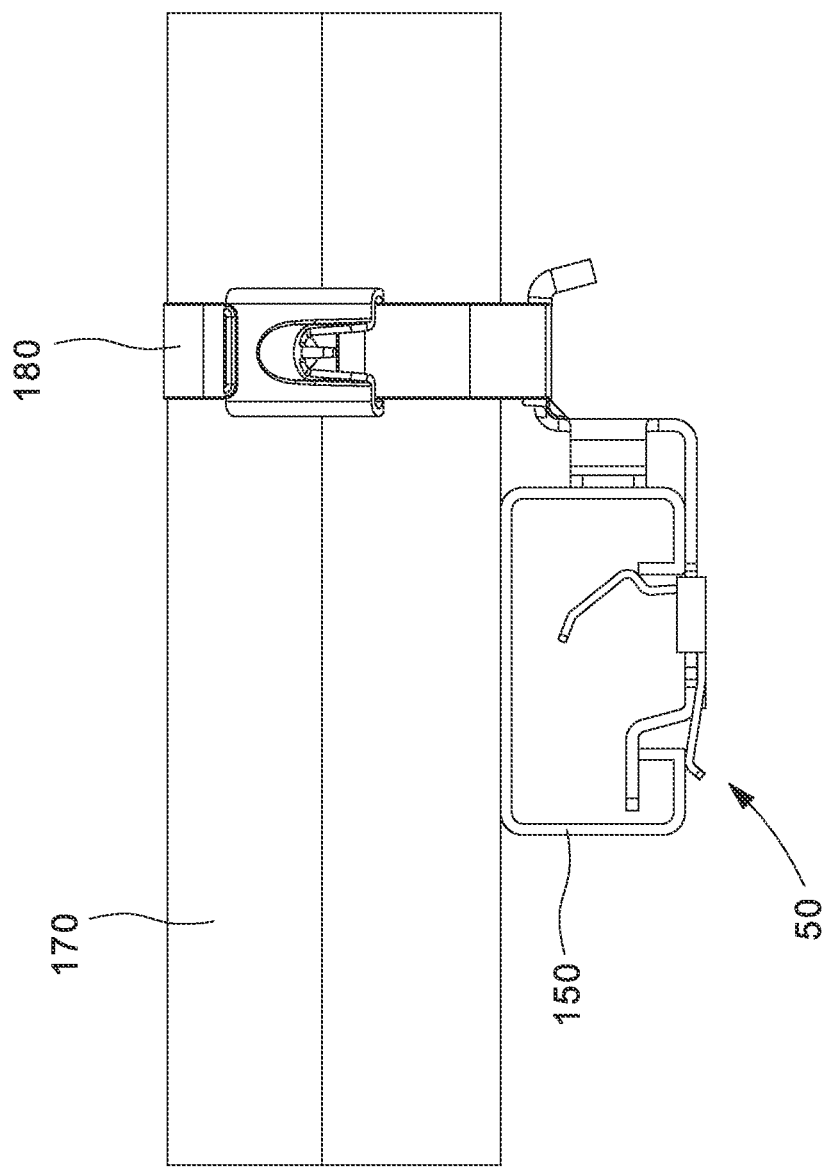
FIG. 1 is a side view of the cable bracket assembly of the present invention attached to a cable tray rung and securing a cable bundle to the cable tray rung.
Figure 2:
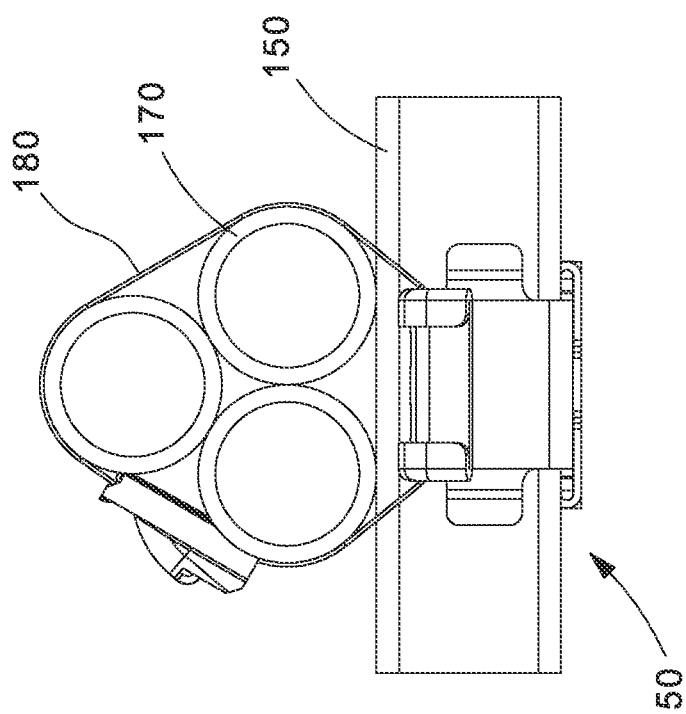
FIG. 2 is a front view of the cable bracket assembly of FIG. 1 attached to the cable tray rung and securing a cable bundle to the cable tray rung.

FIGS. 1 and 2 illustrate the cable bracket assembly 50 installed on a cable tray rung 150. As described below, the cable bracket assembly 50 is a two-piece quick attach bracket assembly that is easily installed on the cable tray rung 150. The cable bracket assembly 50 provides a cable attachment member 78 for supporting a cable bundle 170 and for receiving a cable tie 180 or strap to secure the cable bundle 170.

Figure 3:
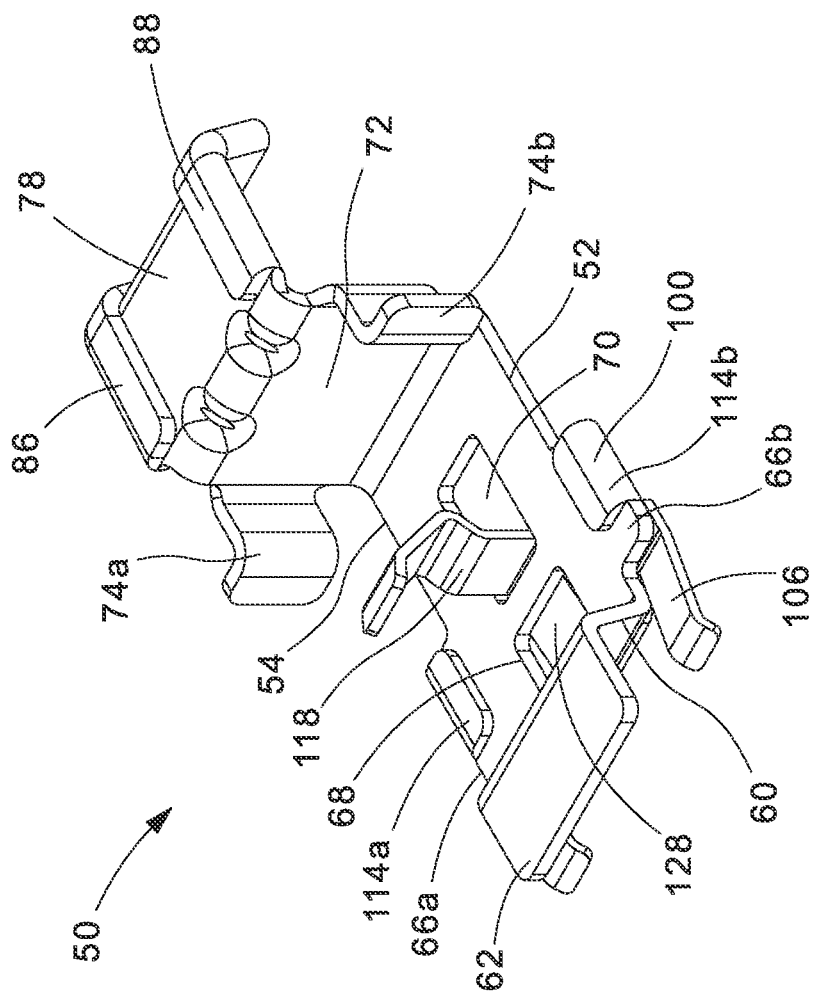
FIG. 3 is a perspective view of the cable bracket assembly of FIG. 1.
Figure 4:
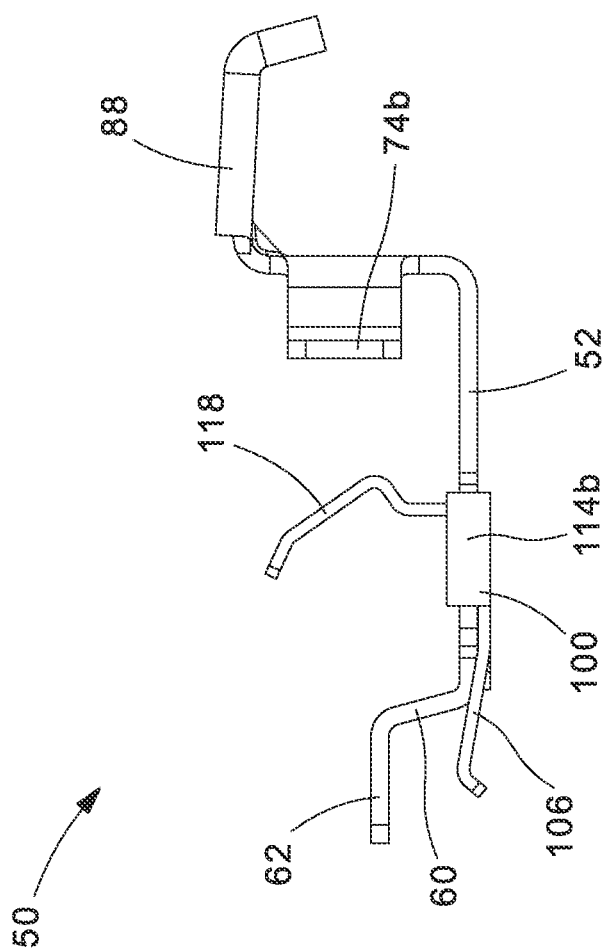
FIG. 4 is a side view of the cable bracket assembly of FIG. 3.

FIGS. 3-4 illustrate the cable bracket assembly 50. The cable bracket assembly 50 includes a bracket main body 52 and a bracket spring attachment 100. As described below, the bracket main body 52 and the bracket spring attachment 100 are easily slid together to form the cable bracket assembly 50 of the present invention.

Figure 5:
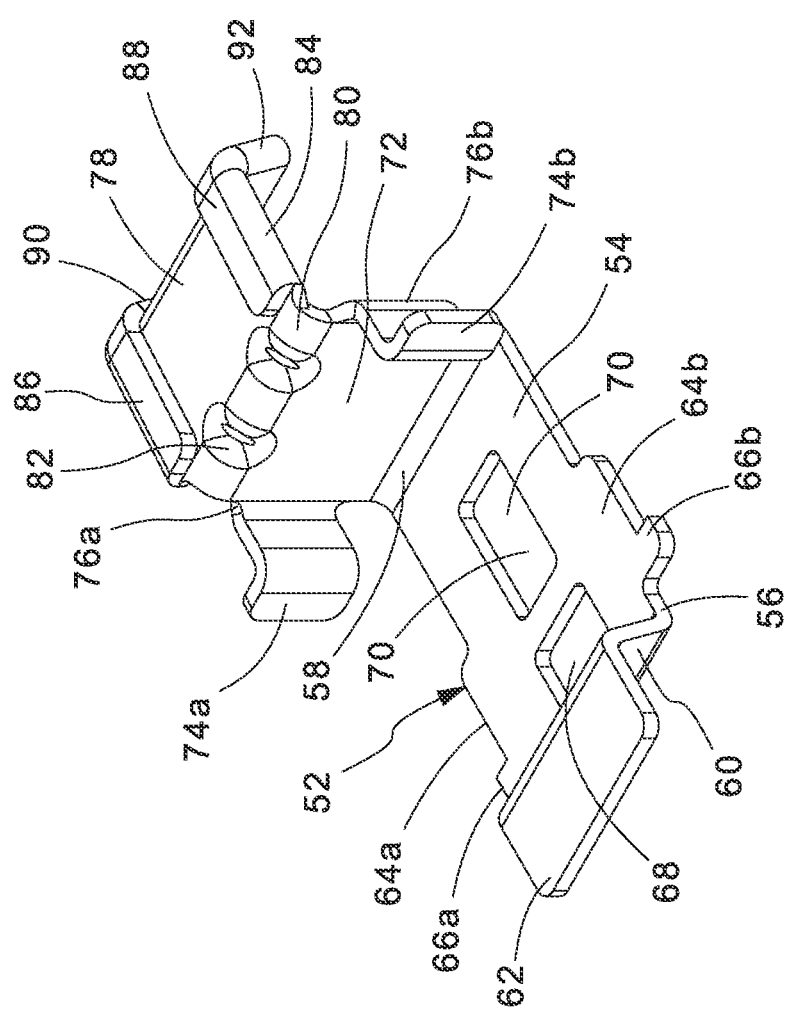
FIG. 5 is a perspective view of the bracket main body of the cable bracket assembly of FIG. 3.
Figure 6:
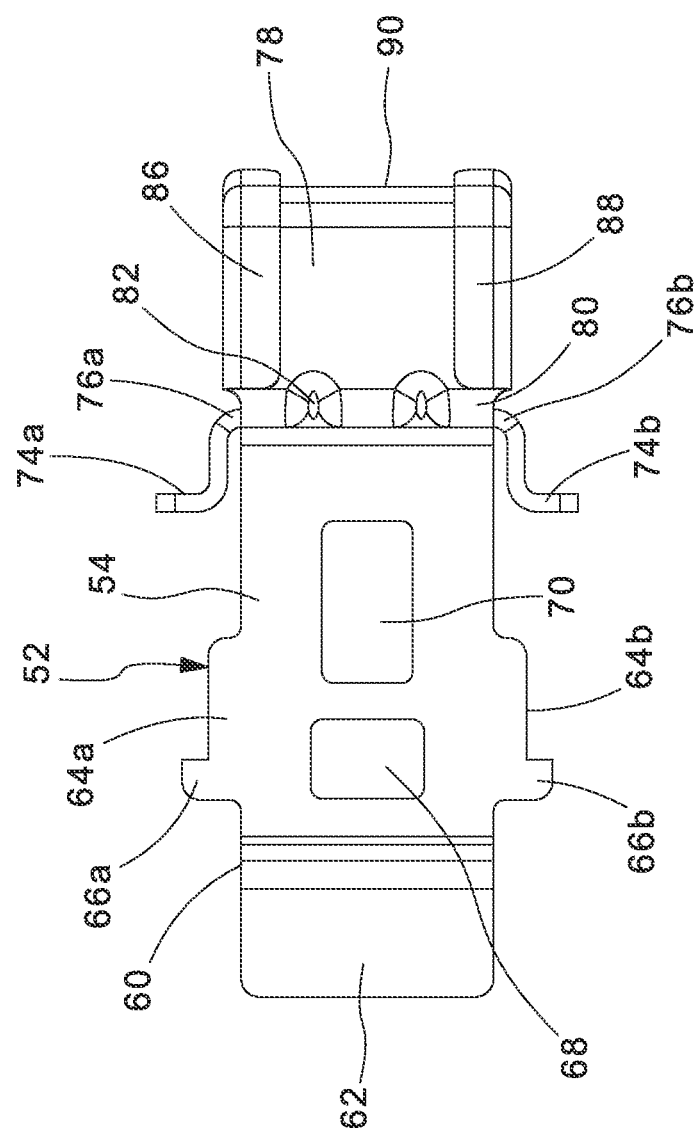
FIG. 6 is a top view of the bracket main body of FIG. 5.
Figure 7:
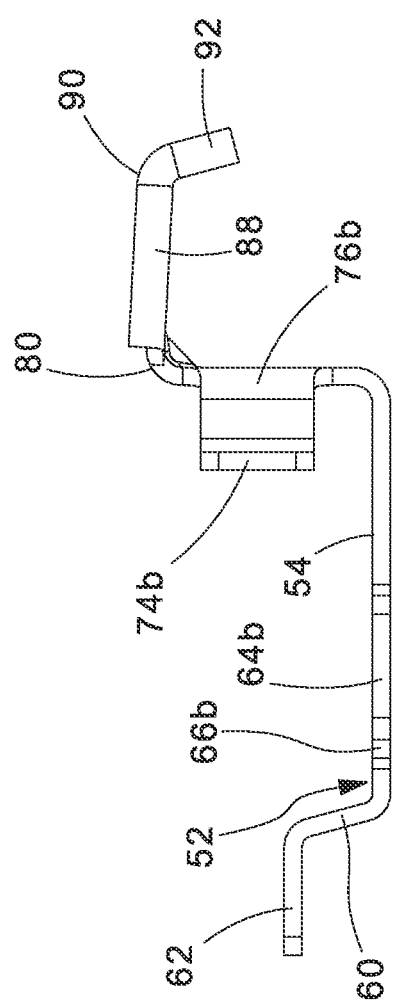
FIG. 7 is a side view of the bracket main body of FIG. 5.
Figure 8:
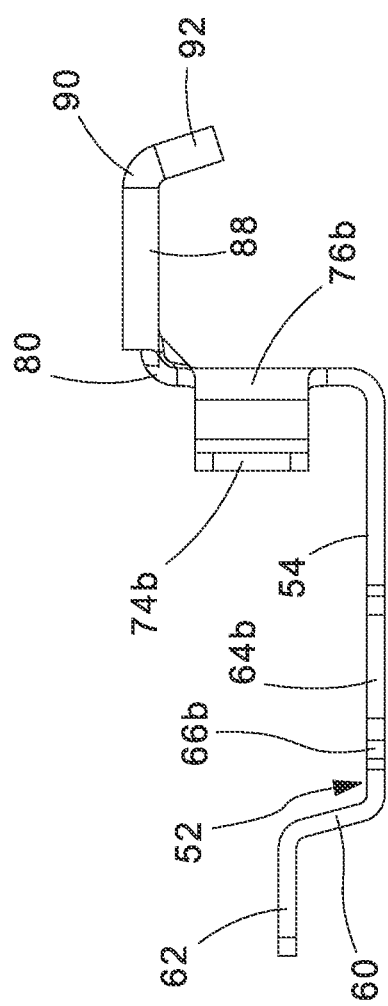
FIG. 8 is side view of an alternative bracket main body of FIG. 7.

FIGS. 5-8 illustrate the bracket main body 52. The bracket main body 52 includes a base plate 54 with a first end 56 and a second end 58. A short angular wall 60 extends from the first end 56 of the base plate 54 to a horizontal shelf 62. As illustrated in FIGS. 7 and 8, the horizontal shelf 62 is parallel to the base plate 54 of the main body 52. The base plate 54 includes two shoulders 64a, 64b with each shoulder 64a, 64b having a projection 66a, 66b, respectively, attached thereto and extending outward therefrom. The base plate 54 also includes a first rectangular cutout 68 and a second rectangular cutout 70.

A stabilizing wall 72 extends from the second end 58 of the base plate 54 to the cable attachment member 78. The stabilizing wall 72 includes two stabilizing wings 74a, 74b, one positioned on each side of the stabilizing wall 72. The stabilizing wings 74a, 74b are generally L-shaped with a radial bend 76a, 76b that attaches the stabilizing wings 74a, 74b, respectively, to the stabilizing wall 72. As illustrated in FIGS. 5 and 6, each stabilizing wing 74a, 74b extends away from the stabilizing wall 72.

A gusseted bend 80 connects the stabilizing wall 72 and the cable attachment member 78. The gusset bend 80 is illustrated with two gussets 82, however it is contemplated that the gusseted bend 80 may include one or more gussets. As illustrated in FIG. 7, the cable attachment member 78 extends outward horizontally from the stabilizing wall 72 such that the cable attachment member 78 is parallel to the base plate 54. Alternatively, as illustrated in FIG. 8, the cable attachment member 78 may slightly slope at an angle downwards. The cable attachment member 78 includes a first hem flange 86 and second hem flange 88 running along the side edges 84 of the cable attachment member 78. An angular tip 92 or flange extends from the outer edge 90 of the cable attachment member 78.

Figure 9:
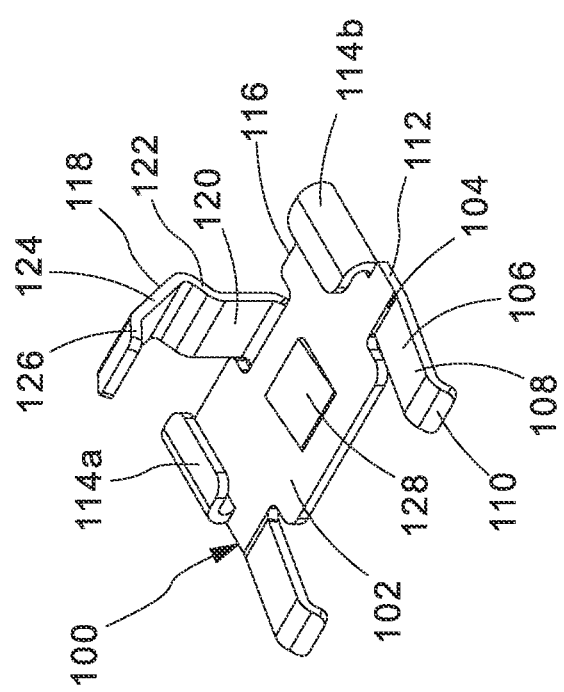
FIG. 9 is a perspective view of the bracket spring attachment of FIG. 3.
Figure 10:
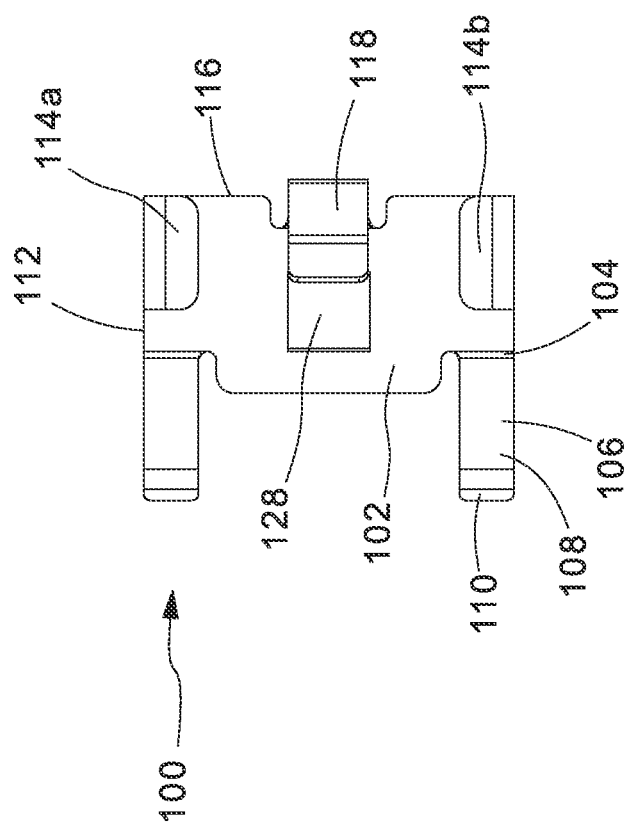
FIG. 10 is a top view of the bracket spring attachment of FIG. 9.
Figure 11:
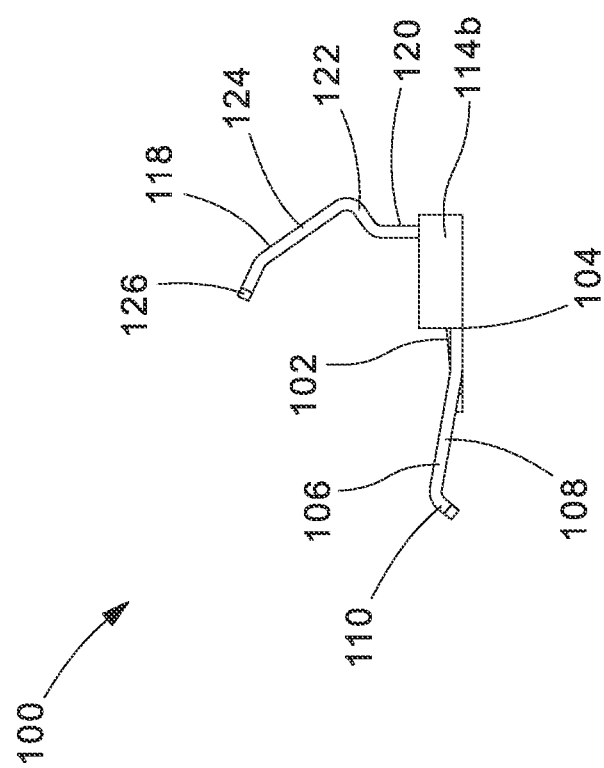
FIG. 11 is a side view of the bracket spring attachment of FIG. 9.

FIGS. 9-11 illustrate the bracket spring attachment 100. The bracket spring attachment 100 includes a main plate 102 with a first end 104 and a second end 116. Spring tabs 106 extend from the first end 104 of the main plate 102. The spring tabs 106 are positioned at the sides 112 of the main plate 102 and include an elongated angular flange 108 with a downwardly extending tip 110. The spring tabs 106 help stabilize the cable bracket assembly 50 when installed on the cable tray rung 150.

A snap-in spring tongue 118 extends from the second end 116 of the main plate 102. The snap-in spring tongue 118 is positioned at the center of the main plate 102. The snap-in spring tongue 118 is positioned equal distance from each spring tab 106. The snap-in spring tongue 118 includes a vertical portion 120, a short angular portion 122, a longer angular portion 124, and a bent tip 126. The snap-in spring tongue 118 retains the cable bracket assembly 50 on the cable tray rung 150.

The main plate 102 includes two open hem flanges 114a, 114b positioned along the side edges and extending from the second end 116 towards the center of the main plate 102. As described below, the open hem flanges 114a, 114b receive the shoulders 64a, 64b extending from the base plate 54 of the bracket main body 52.

The main plate 102 also includes a lanced louver 128. The lanced louver 128 extends upwards from the center of the main plate 102. The lanced louver 128 is aligned with the snap-in spring tongue 118. The lanced louver 128 secures the bracket spring attachment 100 to the bracket main body 52.

Figure 12:
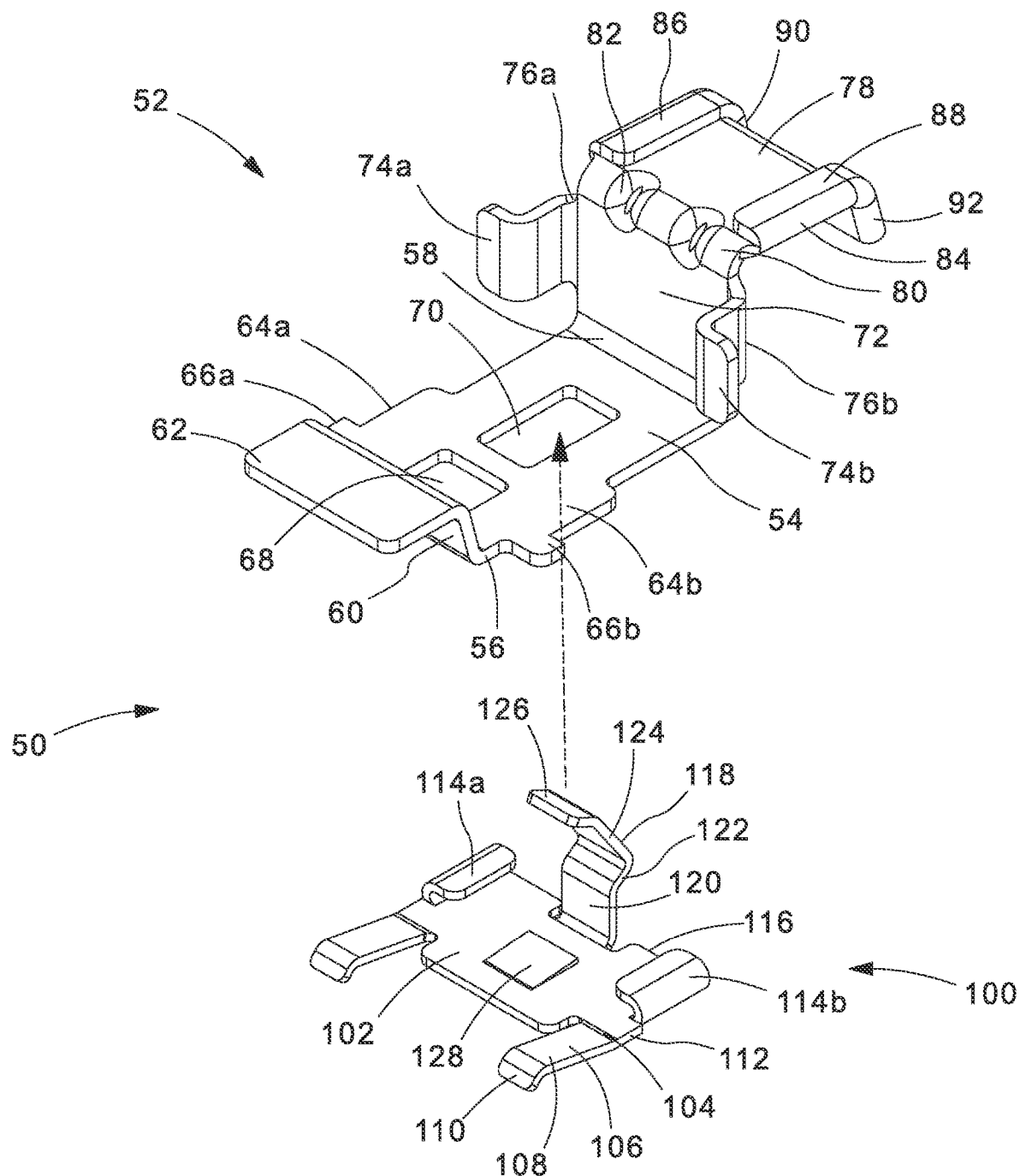
FIG. 12 is a perspective exploded view of the bracket main body and the bracket spring attachment of FIG. 3.
Figure 13:
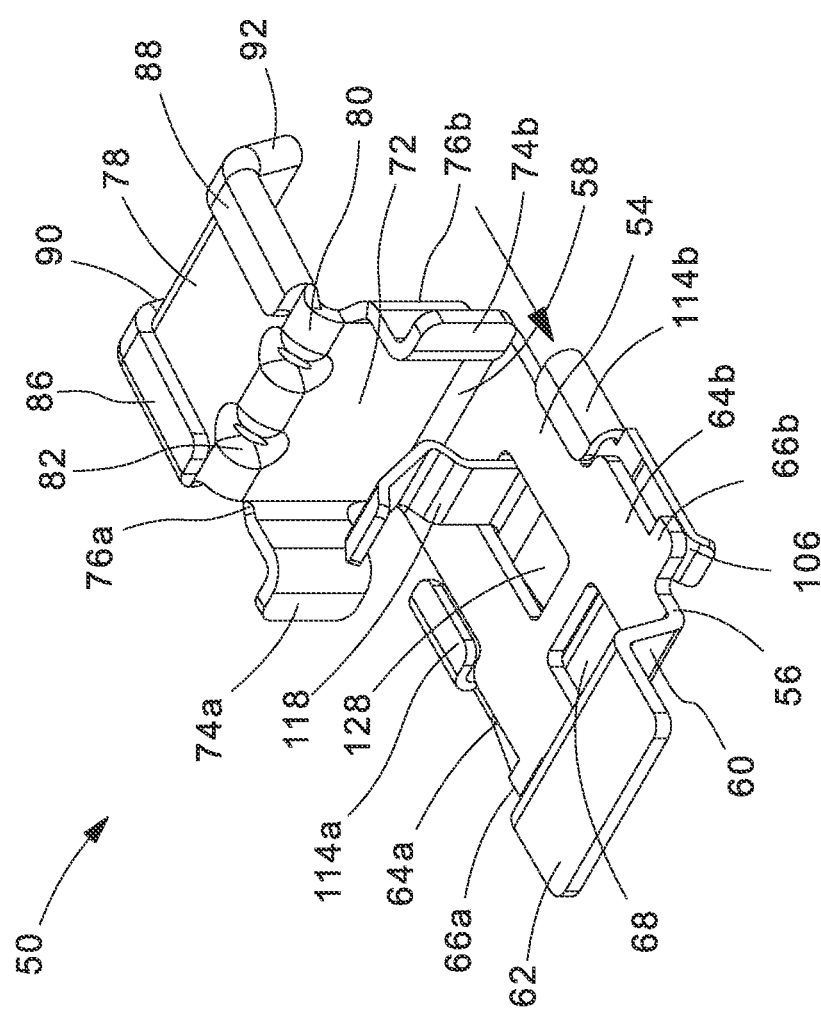
FIG. 13 is a perspective partially assembled view of the bracket main body and the bracket spring attachment of FIG. 12.
Figure 14:
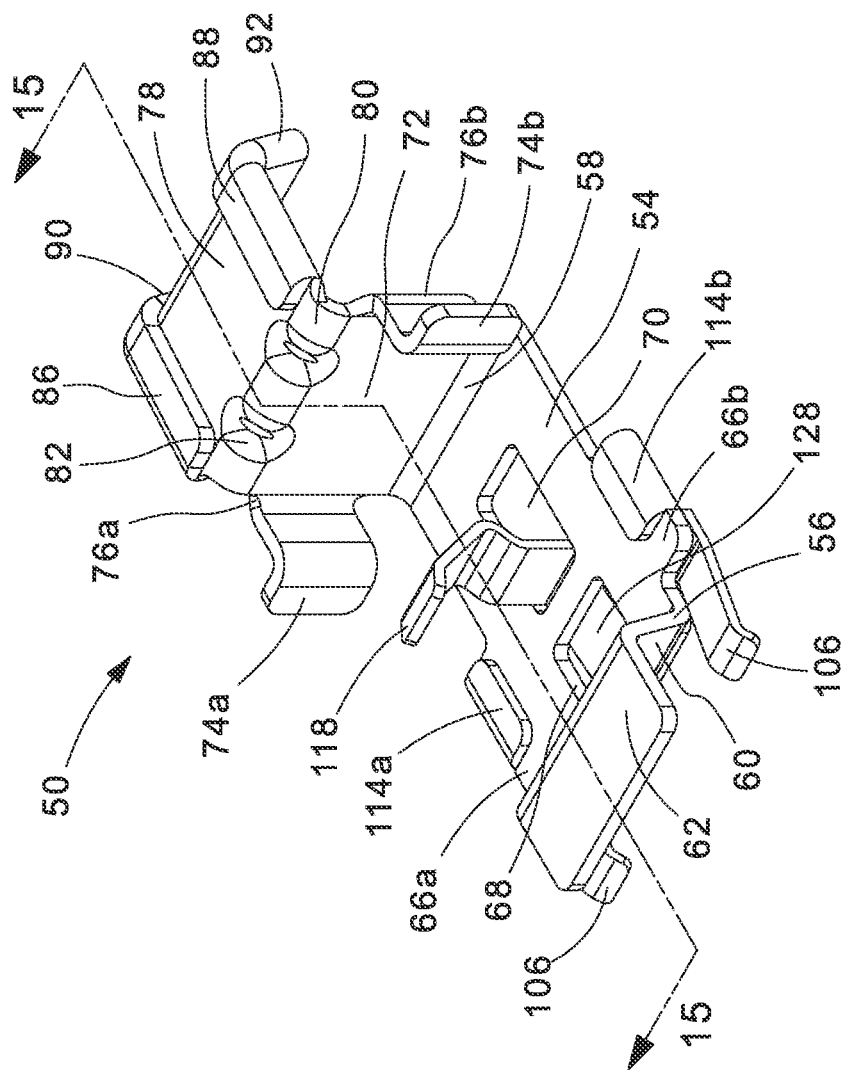
FIG. 14 is a perspective fully assembled view of the bracket main body and the bracket spring attachment of FIG. 12.
Figure 15:
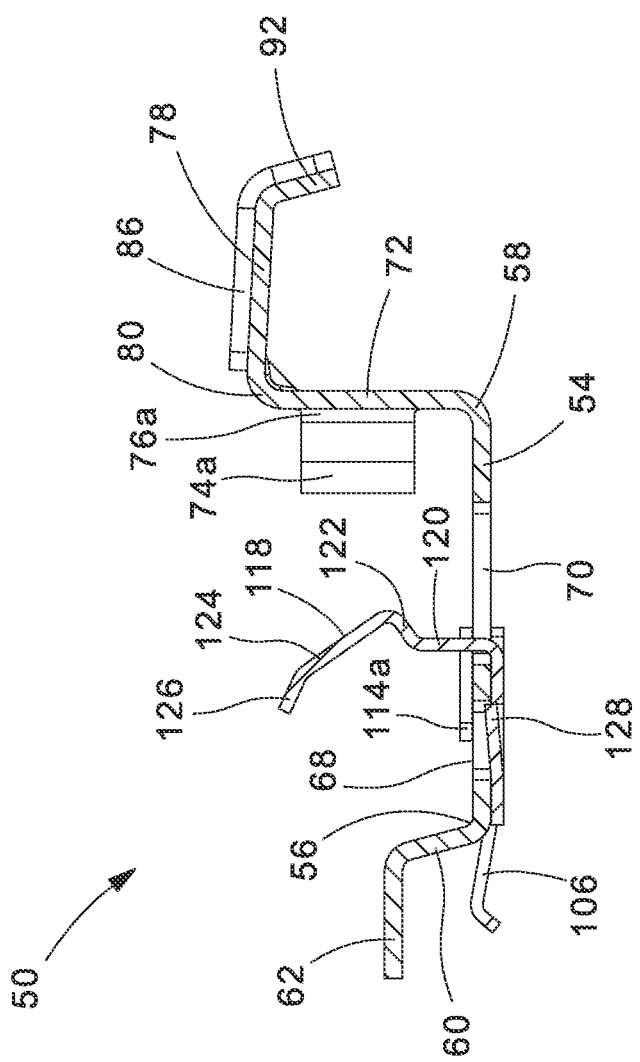
FIG. 15 is a cross-sectional view of the fully assembled bracket main body and bracket spring attachment of FIG. 14 taken along line 15-15.

FIGS. 12-15 illustrate the installation of the bracket spring attachment 100 on to the bracket main body 52 to form the 2-piece bracket assembly. As illustrated in FIG. 12, the snap-in spring tongue 118 is positioned below the bracket main body 52. The snap-in spring tongue 118 is inserted through the second rectangular cutout 70 in the base plate 54 as illustrated in FIG. 13. Next, the open hem flanges 114a, 114b of the bracket spring attachment 100 are aligned with the shoulders 64a, 64b of the base plate 54 of the bracket main body 52. As illustrated in FIG. 13, the bracket spring attachment 100 is pushed along the shoulders 64a, 64b extending from the base plate 54 of the bracket main body 52 until the open hem flanges 114a, 114b of the bracket spring attachment 100 rest against the projections 66a, 66b extending from the shoulders 64a, 64b of the base plate 54 (see FIG. 14). While the bracket spring attachment 100 is slid along the base plate 54 of the bracket main body 52, the lanced louver 128 engages the bottom of the base plate 54 until it snaps into the first rectangular cutout 68 in the base plate 54. As illustrated in FIGS. 14 and 15, the bracket spring attachment 100 is secured to the bracket main body 52 once the lanced louver 128 has snapped into place.

Figure 16:
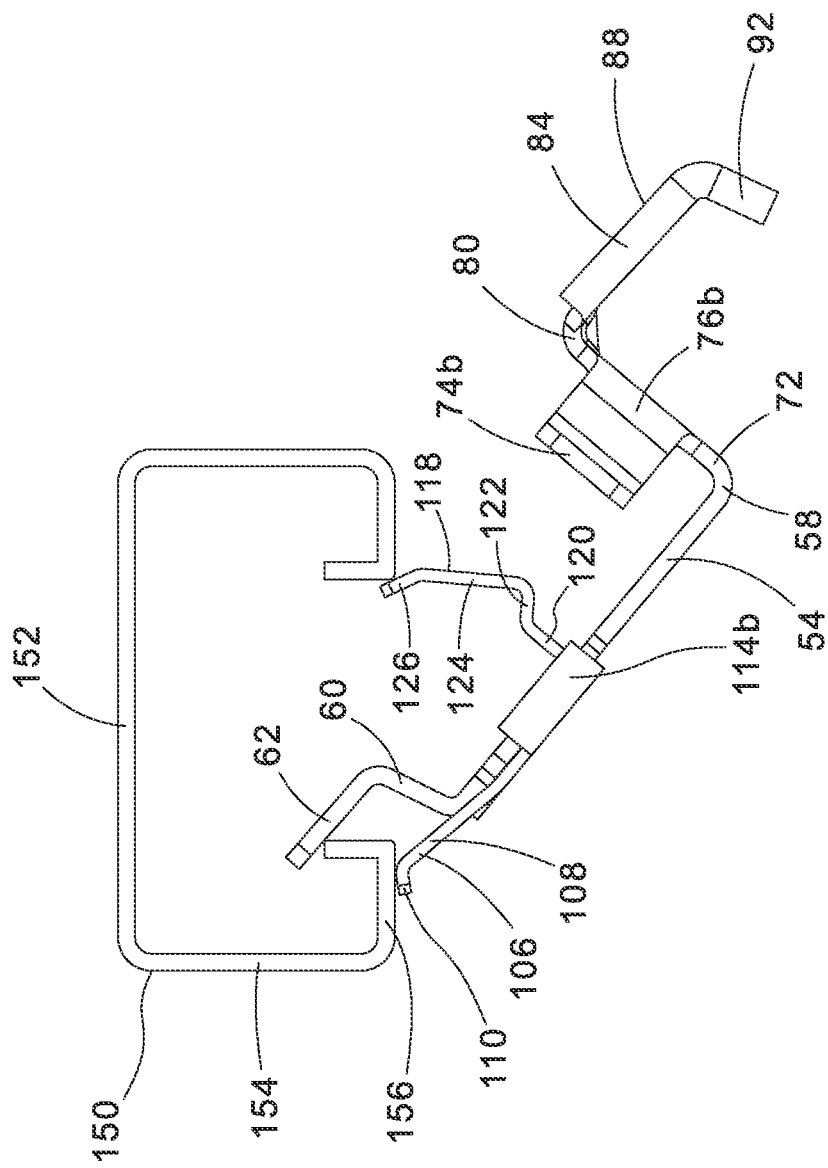
FIG. 16 is a side view of the cable bracket assembly of FIG. 14 positioned to be installed on a cable tray rung.
Figure 17:
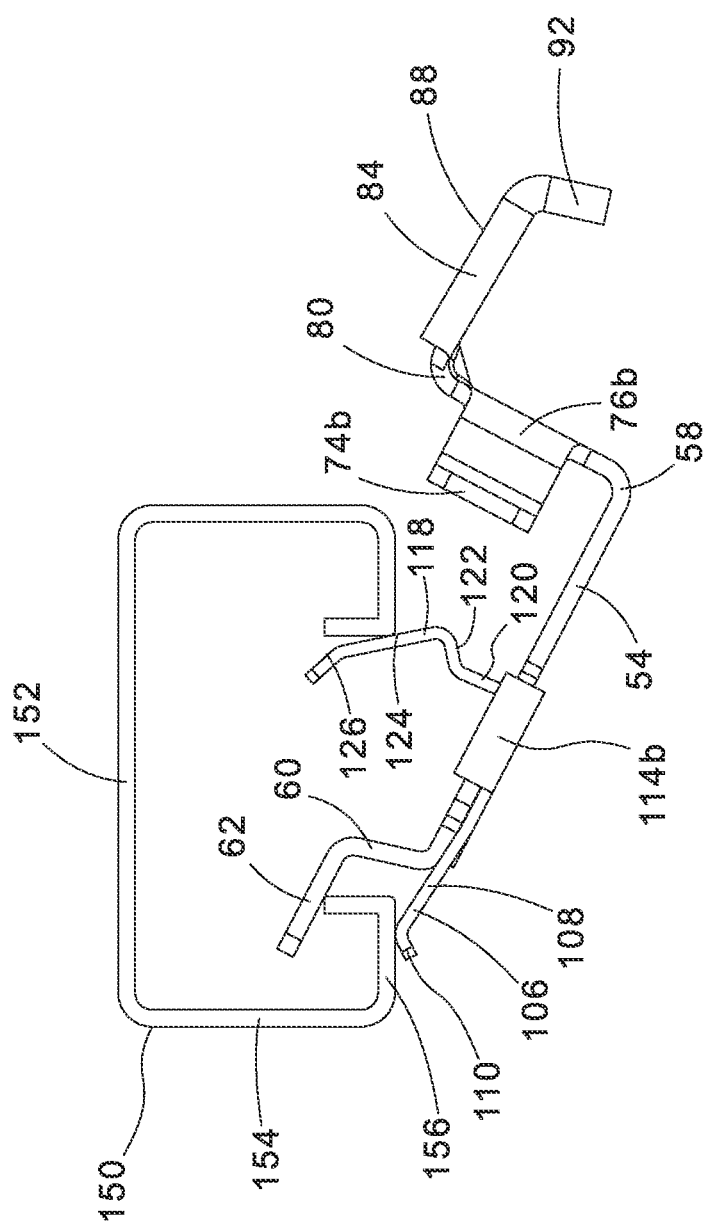
FIG. 17 is a side view of the cable bracket assembly of FIG. 14 initially installed on a cable tray rung.
Figure 18:
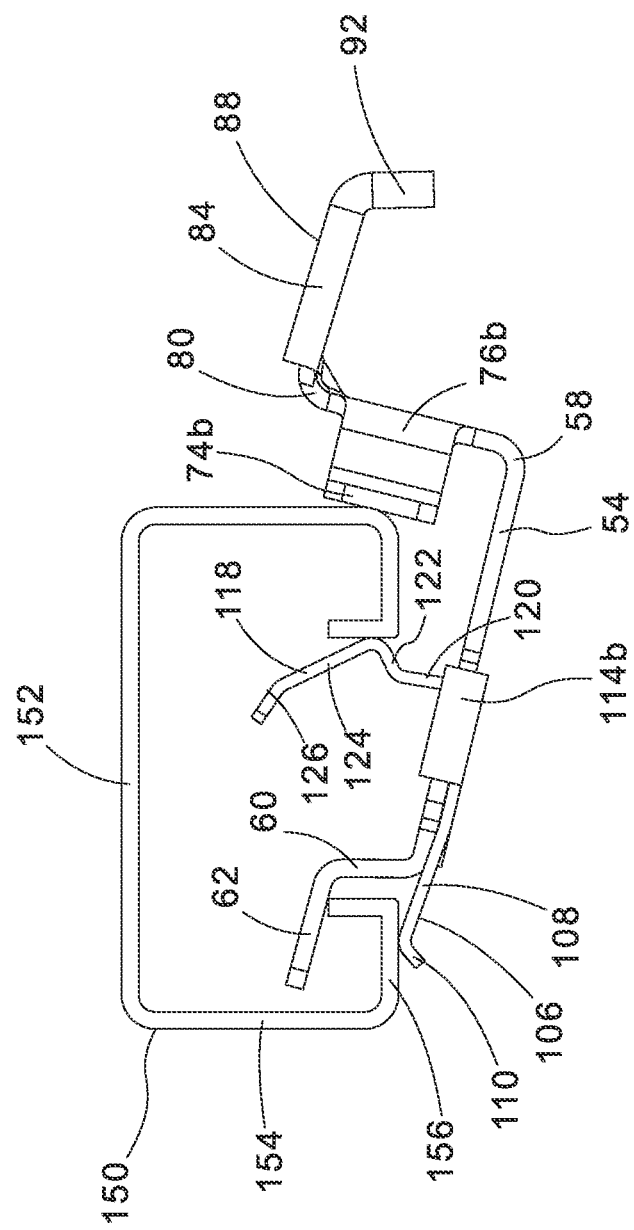
FIG. 18 is a side view of the cable bracket assembly of FIG. 14 partially installed on a cable tray rung.
Figure 19:
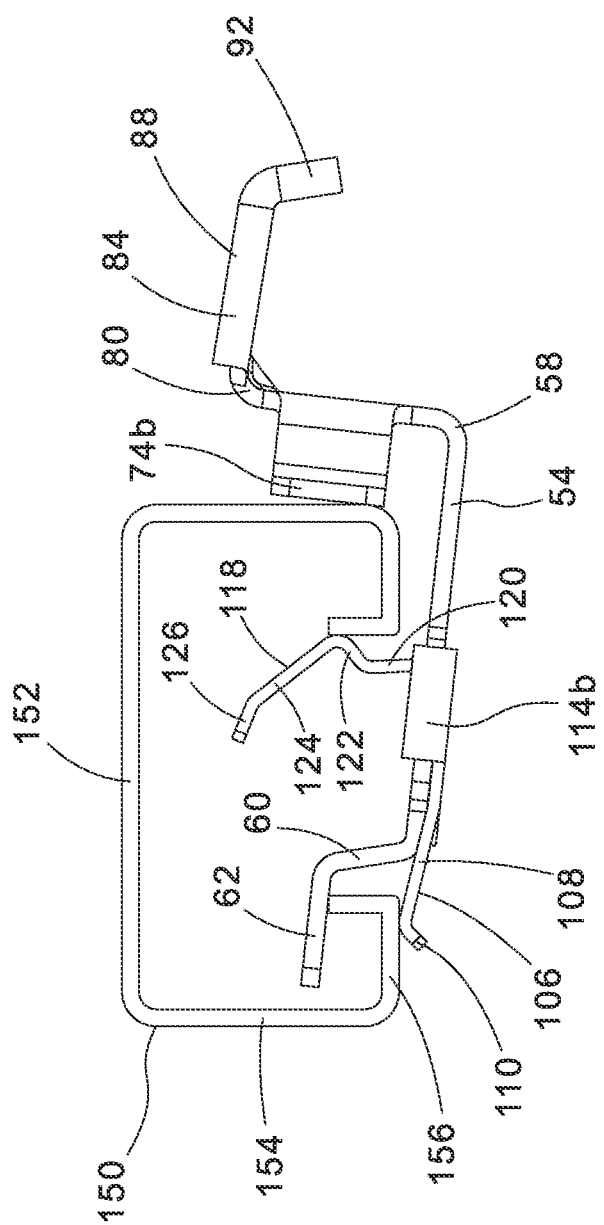
FIG. 19 is a side view of the cable bracket assembly of FIG. 14 partially installed on a cable tray rung.
Figure 20:
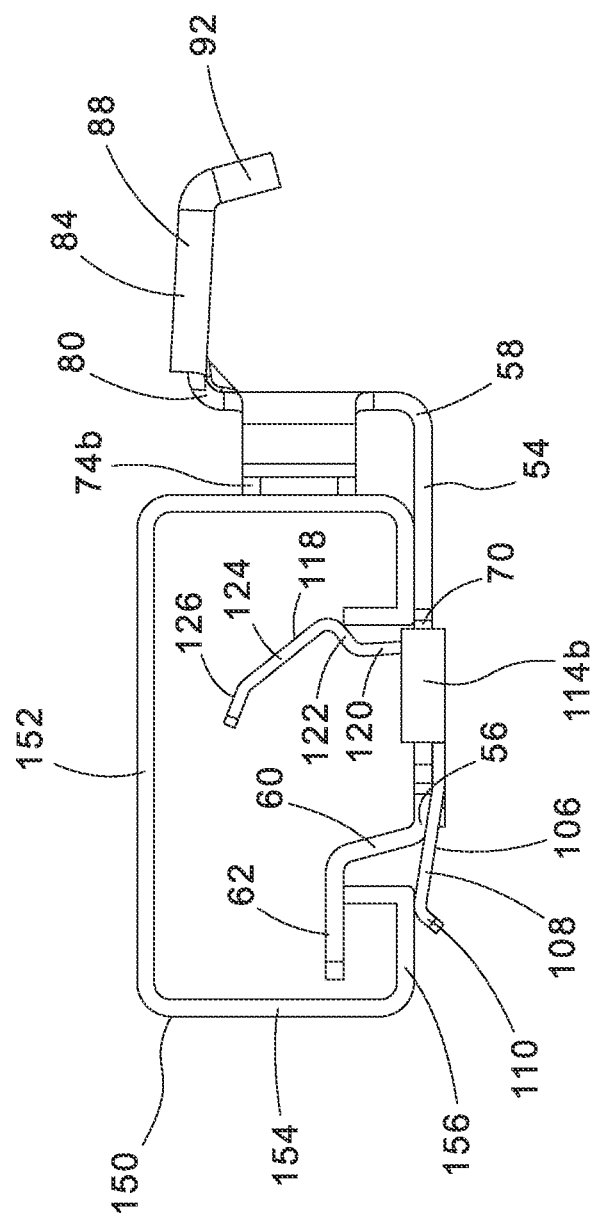
FIG. 20 is a side view of the cable bracket assembly of FIG. 14 installed on a cable tray rung.

FIGS. 16-20 illustrate the cable bracket assembly 50 of the present invention being installed on a cable tray rung 150. The cable tray rung 150 is a strut type rung having a top 152, downwardly extending sides 154 and inwardly extending flanged ends 156. To install the cable bracket assembly 50 on the cable tray rung 150, the cable bracket assembly 50 is first partially inserted under the cable tray rung 150. As illustrated in FIG. 16, the horizontal shelf 62 of the bracket main body 52 engages the top of one of the flange ends 156 and the spring tabs 106 of the bracket spring attachment 100 engage the bottom of the flange end 156. The snap-in spring tongue 118 engages the flange end 156 on the opposite side of the cable tray rung 150. As illustrated in FIG. 17, the cable bracket assembly 50 is pushed in the opening of the strut type cable tray rung 150 and rotated upwards. FIG. 18 illustrates the cable bracket assembly 50 partially installed on the cable tray rung 150. The cable bracket assembly 50 continues to rotate upwards until one of the flange ends 156 of the cable tray rung 150 is positioned near the end of the long angular portion 124 of the snap-in spring tongue 118. Next, as illustrated in FIG. 19, the cable bracket assembly 50 is pushed upwards until the snap-in spring tongue 118 is positioned such the flange end 156 engages the short angular portion 122 of the snap-in tongue 118, as illustrated in FIG. 20.

During installation, the snap-in spring tongue 118 is deflected by the flange end 156 of the cable tray rung 150 allowing the flange end 156 to pass downwards, until it rests on the base plate 54 of the bracket main body 52. Then, the snap-in spring tongue 118 partially relaxes and presses against the corner of the flange end 156 of the cable tray rung 150. The snap-in spring tongue 118 holds the cable bracket assembly 50 securely in place on the cable tray rung 150 enabling cables to be secured to the cable tray rung 150 with a cable tie 180 or strap. FIG. 20 illustrates the cable bracket assembly 50 fully installed on the cable tray rung 150.

As illustrated in FIGS. 1 and 2, once the cable bracket assembly 50 is installed on the cable tray rung 150, a cable or a cable bundle 170 may be positioned on the cable tray rung 150 and cable attachment member 78 of the cable bracket assembly 50. A cable tie 180 or strap is installed around the cable bundle 170 and cable attachment member 78 to secure the cable bundle 170.

The cable bracket assembly of the present invention can be easily attached or removed from a cable tray rung without the use of tools. The cable bracket assembly provides a firm hold on the cable tray rung to diminish the possibility of unintentional movement along the cable tray rung. The spring-loaded cable bracket assembly compensates for dimensional variations in cable tray rungs. Additionally, the cable bracket assembly provides a savings in installation costs due to the elimination of the need for installation tools.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

I claim:

1. A mounting bracket for attaching a cable bundle to a cable tray rung, the mounting bracket comprising:
a bracket main body having a base plate and a cable attachment member for supporting the cable bundle, wherein the base plate of the bracket main body having a first end and a second end, wherein a stabilizing wall extends from the second end of the base plate to the cable attachment member;
wherein an angular wall extends from the first end of the base plate to a horizontal shelf; and a bracket spring attachment slidingly engaging the bracket main body for securing the bracket main body to the cable tray rung.

2. The mounting bracket of claim 1, wherein the base plate includes a shoulder extending from each side of the base plate, the shoulders having a projection that extends outwardly from the shoulders away from the base plate.

3. The mounting bracket of claim 1, wherein the base plate having a first cutout and a second cutout, the first and second cutouts receive the bracket spring attachment.

4. The mounting bracket of claim 1, wherein the stabilizing wall includes stabilizing wings extending from sides of the stabilizing wall, the stabilizing wings are L-shaped with a radial bend at the stabilizing wall, whereby the stabilizing wings engage a side of the cable tray rung to position the mounting bracket.

5. The mounting bracket of claim 1, wherein the cable attachment member extends horizontally from the stabilizing wall.

6. The mounting bracket of claim 5, wherein the cable attachment member is parallel to the base plate.

7. The mounting bracket of claim 5, wherein the cable attachment member extends at an angle downwards away from the base plate.

8. The mounting bracket of claim 5, wherein the cable attachment member includes hem flanges extending along the side edges of the cable attachment member and an angular tip extending from an outer edge of the cable attachment member.

9. A cable bracket secured to a cable tray rung for securing at least one cable to the cable tray rung, the cable bracket and cable tray rung assembly comprising:
a cable tray rung, wherein the cable tray rung having a top, downwardly extending sides, and inwardly extending flanged ends, the cable tray rung having a bottom opening;
a bracket having a main body with a base plate and a cable attachment member, and a bracket spring attachment slidingly engaging the main body;
wherein the cable bracket is partially inserted in the bottom opening of the cable tray rung with a horizontal shelf of the bracket main body engaging a top of one of the flanged ends of the cable tray rung and spring tabs of the bracket spring attachment engaging a bottom of the flanged end;
whereby the at least one cable is positioned on the cable tray rung; the cable attachment member supports the at least one cable, and a tie secures the at least one cable to the cable attachment member.

10. The cable bracket and cable tray rung assembly of claim 9, wherein the base plate of the bracket main body having a first end and a second end; an angular wall extends from the first end of the base plate to a horizontal shelf; a shoulder extends from each side of the base plate, each shoulder has a projection that extends outwardly from the shoulder away from the base plate; and a stabilizing wall extends from the second end of the base plate to the cable attachment member, the stabilizing wall has stabilizing wings that extend from sides of the stabilizing wall, whereby the stabilizing wings engage a side of the cable tray rung when the cable bracket is installed on the cable tray rung.

11. The cable bracket and cable tray rung assembly of claim 9, wherein the base plate having a first cutout and a second cutout, the first and second cutouts receive the bracket spring attachment;

wherein the bracket spring attachment having a main plate with a first end and a second end; wherein spring tabs extend from the first end of the main plate of the bracket spring attachment, the spring tabs include an angular flange with a downwardly extending tip; whereby the spring tabs stabilize the cable bracket when installed on the cable tray rung;
wherein a snap-in spring tongue extends from a second end of the main plate of the bracket spring attachment, the snap-in spring tongue includes a vertical portion, a short angular portion, a longer angular portion, and a bent tip; the snap-in spring tongue extends through the second cutout of the base plate to retain the cable bracket on the cable tray rung;
wherein the main plate of the bracket spring attachment has open hem flanges positioned along side edges of the main plate from the second end towards a center of the main plate, the open hem flanges receive shoulders extending from the base plate of the bracket main body; and
wherein the main plate having a lanced louver extending upwards from a center of the main plate, the lanced louver engages the first cutout in the base plate to secure the bracket spring attachment to the bracket main body.

12. The cable bracket and cable tray rung assembly of claim 9, wherein the bracket is pushed into the opening of the cable tray rung and rotated upwards until a snap-in spring tongue presses against a corner of one of the flanged ends of the cable tray rung to hold the bracket in place on the cable tray rung enabling the at least one cable to be secured to the cable tray rung by the tie.

13. A mounting bracket for attaching a cable bundle to a cable tray rung, the mounting bracket comprising:
a bracket main body having a base plate and a cable attachment member for supporting the cable bundle; and
a bracket spring attachment slidingly engaging the bracket main body for securing the bracket main body to the cable tray rung, wherein the bracket spring attachment having a main plate with a first end and a second end; wherein spring tabs extend from the first end of the main plate of the bracket spring attachment, the spring tabs include an angular flange with a downwardly extending tip; whereby the spring tabs stabilize the mounting bracket when installed on the cable tray rung.

14. The mounting bracket of claim 13, wherein a snap-in spring tongue extends from a second end of the main plate of the bracket spring attachment, the snap-in spring tongue includes a vertical portion, a short angular portion, a longer angular portion, and a bent tip; whereby the snap-in spring tongue retains the mounting bracket on the cable tray rung.

15. The mounting bracket of claim 13, wherein the main plate of the bracket spring attachment has open hem flanges positioned along side edges of the main plate from the second end towards a center of the main plate, the open hem flanges receive shoulders extending from the base plate of the bracket main body.

16. The mounting bracket of claim 13, wherein the main plate having a lanced louver extending upwards from a center of the main plate, the lanced louver secures the bracket spring attachment to the bracket main body.

* * * * *